United States Patent [19]

Eichenauer et al.

[11] Patent Number: 5,387,647
[45] Date of Patent: Feb. 7, 1995

[54] THERMOPLASTIC MOLDING COMPOUNDS OF POLYAMIDE AND HYDROGENATED NITRILE RUBBER

[75] Inventors: Herbert Eichenauer; Hartmuth Buding, both of Dormagen; Josef Merten, Korschenbroich; Karl-Heinz Ott, Leverkusen, all of Germany

[73] Assignee: Bayer Aktiengesellschaft, Leverkusen, Germany

[21] Appl. No.: 246,555

[22] Filed: May 19, 1994

Related U.S. Application Data

[63] Continuation of Ser. No. 656,114, Feb. 14, 1991, abandoned, which is a continuation of Ser. No. 386,620, Jul. 31, 1989, abandoned.

[30] Foreign Application Priority Data

Aug. 13, 1988 [DE] Germany .............................. 3827529

[51] Int. Cl.$^6$ ............................................. C08L 77/00
[52] U.S. Cl. ........................................ 525/179; 525/63; 525/66; 525/133; 525/183; 525/184
[58] Field of Search ............... 525/184, 183, 179, 133, 525/66

[56] References Cited

U.S. PATENT DOCUMENTS

| | | | |
|---|---|---|---|
| 4,356,286 | 10/1982 | Bethea et al. | 525/183 |
| 4,581,417 | 4/1986 | Buding et al. | 525/338 |
| 4,996,264 | 2/1991 | Aonuma et al. | 525/179 |

OTHER PUBLICATIONS

New Polymeric Materials, Reactive Processing and Physical Properties . . . , Seminar Jun. 1986: Naples Chemical Abstracts, Plastics Manufacture and processing, Aug. 1988: Columbus, Ohio.

*Primary Examiner*—Ana L. Carrillo
*Attorney, Agent, or Firm*—Connolly & Hutz

[57] ABSTRACT

The invention relates to thermoplastic molding compounds of 70 to 99.5% by weight thermoplastic polyamides and 30 to 0.5% by weight hydrogenated nitrile rubber and 0 to 29.5% by weight thermoplastic resin components and, optionally, standard additives in typical quantities. These thermoplastic molding compounds show high strength values, very good moldability and, above all, high weathering resistance.

9 Claims, No Drawings

THERMOPLASTIC MOLDING COMPOUNDS OF POLYAMIDE AND HYDROGENATED NITRILE RUBBER

This application is a continuation of application Ser. No. 07/656,114 filed on Feb. 14, 1991, now abandoned which is a continuation of application Ser. No. 07/386,620, filed Jul. 31, 1989 now abandoned.

This invention relates to thermoplastic molding compounds of 70 to 99.5% by weight thermoplastic polyamides and 30 to 0.5% by weight hydrogenated nitrile rubber. The molding compounds according to the invention show high strength values, very good molding properties and, in particular, high weathering stability. Up to 29.5% by weight of thermoplastic resin components can be used additionally.

Mixtures of thermoplastic polyamides and nitrile rubbers are known (cf. for example DE-A 2 709 060). Mixtures of thermoplastic polyamides and rubber components free from double bonds have also been described (cf. for example EP-A-0 194 705).

Although these known thermoplastic molding compounds can be processed into moldings showing high strength value, they do not show the desired combination of good moldability and high weathering stability of the resulting moldings.

It has now been found that thermoplastic mixtures of polyamides and hydrogenated nitrile rubbers show high strength values, very good moldability and, above all, high weathering stability.

The present invention relates to thermoplastic molding compounds of

A) at least 70% by weight (70 to 99.5% by weight) and preferably at least 75% by weight (75 to 97.5% by weight) of a thermoplastic polyamide or mixtures of several thermoplastic polyamides.

B) from 30 to 0.5% by weight, preferably from 25 to 2.5% by weight and, more preferably, from 24 to 2.5% by weight of a hydrogenated nitrile rubber and C) from 0 to 29.5% by weight, preferably from 0 to 29.5% by weight and, more preferably, from 1 to 22.5% by weight (based on A+B+C) of thermoplastic resin components and, optionally, standard additives.

In the context of the invention, thermoplastic polyamides (A) are known homopolyamides, copolyamides and mixtures of these polyamides. The polyamides may be semicrystalline and/or amorphous.

Thus, polyamide-6, polyamide-6,6 and corresponding copolymers of these two components may be used as partially crystalline polyamides for the molding compounds according to the invention. Other suitable partially crystalline polyamides are those of which the acid component consists completely or partly of terephthalic acid and/or isophthalic acid and/or suberic acid and/or sebacic acid and/or azelaic acid and/or adipic and/or cyclohexane dicarboxylic acid; of which the diamine component consists completely or partly of m- and/or p-xylylene diamine and/or hexamethylene diamine and/or 2,2,4-trimethyl hexamethylene diamine and/or 2,4,4-trimethyl hexamethylene diamine and/or isophorone diamine and of which the composition is known.

Other suitable polyamides are those produced completely or partly from lactams containing from 7 to 12 C atoms in the ring, optionally using one or more of the starting components mentioned above.

Particularly preferred partially crystalline polyamides are polyamide-6 and polyamide-6,6.

Known products may be used as the amorphous polyamides. They are obtained by polycondensation of diamines, such as ethylene diamine, hexamethylene diamine, decamethylene diamine, 2,2,4- and/or 2,4,4-trimethyl hexamethylene diamine, m- and/or p-xylylene diamine, bis-(4-aminocyclohexyl)-methane, bis-(4-aminocyclohexyl)-propane, 3,3'-dimethyl-4,4'-diaminodicyclohexyl methane, 3-aminomethyl-3,5,5-trimethylcyclohexyl amine, 2,5- and/or 2,6-bis-(aminomethyl)-norbornone and/or 1,4-diaminomethylcyclohexane, with dicarboxylic acids, such as oxalic acid, adipic acid, azelaic acid, decanedicarboxylic acid, hepta-decanedicarboxylic acid, 2,2,4- and/or 2,4,4-trimethyl adipic acid, isophthalic acid and terephthalic acid.

Copolymers obtained by polycondensation of several monomers are also suitable as are copolymers which have been prepared with addition of amino carboxylic acids, such as $\epsilon$-aminocaproic acid, $\omega$-aminoundecanoic acid or $\omega$-aminolauric acid or lactams thereof.

Particularly suitable amorphous polyamides are the polyamides prepared from isophthalic acid, hexamethylene diamine and other diamines, such as 4,4'-diaminodicyclohexyl methane, isophorone diamine, 2,2,4- and/or 2,4,4-trimethyl hexamethylene diamine, 2,5- and/or 2,6-bis-(aminomethyl)-norbornene; or from isophthalic acid, 4,4'-diaminodicylohexyl methane and $\epsilon$-caprolactam; or from isophthalic acid, 3,3'-dimethyl-4,4'-diaminodicylohexyl methane and lauric lactam; or from terephthalic acid and the isomer mixture of 2,2,4- and 2,4,4-trimethylhexamethylene diamine.

Instead of using pure 4,4'-diaminodicyclohexyl methane, it is also possible to use mixtures of the position-isomeric diaminodicyclohexyl methanes which consist of 70 to 99 mol-% of the 4,4'-diamino isomer, 1 to 30 mol-% of the 2,4'-diamino isomer, 0 to 2 mol-% of the 2,2'-diamino isomer and, optionally, correspondingly more highly condensed diamines obtained by hydrogenation of technical diaminodiphenyl methane. Up to 30% of the isophthalic acid may be replaced by terephthalic acid.

The polyamides preferably have a relative viscosity (as measured on a 1% by weight solution in m-cresol at 25° C.) of from 2.0 to 5.0 and, more preferably, from 2.5 to 4.0.

Preferred hydrogenated nitrile rubbers (B) in the context of the invention are products obtained by hydrogenation of statistical copolymers of 90 to 45% by weight, preferably 85 to 50% by weight and, more preferably, 82 to 52% by weight of at least one conjugated diene, 10 to 55% by weight, preferably 15 to 50% by weight, and, more preferably, 18 to 48% by weight of at least one unsaturated nitrile and 0 to 10% by weight and preferably 0 to 8% by weight of at least one other monomer copolymerizable with conjugated dienes and unsaturated nitriles.

Suitable conjugated dienes are, for example, 1,3-butadiene, 2-methyl-1,3-butadiene, 2,3-dimethyl-1,3-butadiene and 1,3-pentadiene; suitable unsaturated nitriles are acrylonitrile and methacrylonitrile.

Aromatic vinyl compounds, (meth)acrylates containing 1 to 12 carbon atoms in the alcohol component and $\alpha,\beta$-unsaturated mono- or dicarboxylic acids may be used as further monomers.

Examples of suitable aromatic vinyl compounds are styrene, substituted styrenes, such as o-, m-, p-methyl styrene, ethyl styrene and also vinyl naphthalene and vinyl pyridine; examples of suitable (meth)acrylates are methyl (meth)acrylates, ethyl (meth)acrylate, n-butyl (meth)acrylate, tert.-butyl (meth)acrylate, 2-ethylhexyl (meth)acrylate, 2-hydroxypropyl (meth)acrylate; examples of suitable unsaturated carboxylic acids are α,β-unsaturated monocarboxylic acids containing from 3 to 5 carbon atoms, such as acrylic acid, methacrylic acid and crotonic acid, and also α,β-unsaturated dicarboxylic acids containing 4 to 5 carbon atoms, such as maleic acid, fumaric acid, citraconic acid and itaconic acid; and also the semiesters of α,β-unsaturated dicarboxylic acids, such as maleic acid n-dodecyl semiester or fumaric acid n-butyl semiester.

Other copolymerizable compounds suitable for use in accordance with the invention are vinyl chloride, vinylidene chloride, N-methylol acrylamide, vinyl alkyl ethers containing 1 to 4 carbon atoms in the alkyl group, vinyl esters of carboxylic acids containing 1 to 18 carbon atoms, such as vinyl acetate or vinyl stearate.

Special examples of the copolymers to be hydrogenated include an acrylonitrile/isoprene copolymer, an acrylonitrile/isoprene/butadiene terpolymer, an acrylonitrile/isoprene/n-butyl acrylate terpolymer, an acrylonitrile/butadiene/methyl acrylate terpolymer, an acrylontrile/butadiene/n-butyl acrylate terpolymer, an acrylonitrile/butadiene/2-hydroxypropyl methacrylate terpolymer and an acrylonitrile/butadiene/methacrylic acid terpolymer. An acrylonitrile/butadiene copolymer is particularly preferred.

The production of hydrogenated nitrile rubbers with the nitrile groups intact is known.

The degree of hydrogenation of the polymers (B) (percentage of the hydrogenated C—C double bonds, based on the total number of C—C double bonds originally present in the polymer) is determined by IR or NMR spectroscopy and should be at least 80%, preferably at least 90% and, more preferably, at least 95%.

The hydrogenated polymers (B) are gel-free and are soluble in ketones, such as acetone and butanone; in ethers, such as tetrahydrofuran or dioxane; and in chlorinated hydrocarbons, such as dichloromethane or chlorobenzene.

The molding compounds according to the invention may contain standard additives, such as for example lubricants and mold release agents, nucleating agents, stabilizers, fillers and reinforcing materials, flameproofing agents and also dyes in effective quantities and combinations.

It is also possible to incorporate in the molding compounds according to the invention thermoplastic resin components C) such as, for example, homopolymers or copolymers based on (substituted) styrene (for example styrene/acrylonitrile copolymers, α-methyl styrene/acrylonitrile copolymers) or methyl methacrylate (for example polymethyl methacrylate), polyphenylene ethers based on 2,6-dimethyl phenol and mixtures thereof with high-impact polystyrene (HIPS) or graft rubbers, preferably based on saturated rubbers such as, for example, ethylene/propylene (diene) rubber (EP(D)M rubber), polybutyl acrylate or polysiloxane rubber with, for example, styrene, α-methyl styrene, nucleus-substituted styrene, methyl methacrylate, acrylonitrile, maleic anhydride, N-substituted maleic imide, vinyl acetate or mixtures thereof, as monomers for the synthesis of the graft shell.

The molding compounds may be produced in standard mixing units such as mixing rolls, kneaders, single-screw and multiple-screw extruders.

Although, in most cases, both components are best mixed in a single step, it may also be advisable in some cases initially to omit the second component and to add it at a later stage.

Thus, the molding compounds according to the invention may be produced in the mixing units mentioned by melting and homogenizing the two components A) and B) together or by incorporating the hydrogenated nitrile rubber B) in a melt of the polyamide A).

The temperature at which the mixture is prepared should be at least 10° C. and best at most 80° C. above the melting point of the polyamide.

The molding compounds according to the invention may be used for the production of moldings by injection molding and extrusion, particularly where the described properties are required, for example for external parts of motor vehicles.

EXAMPLES

Polymers Used (P.x)

P.A) Polyamide-6 having a relative viscosity (as measured on a 1% by weight solution in m-kresol at 25° C.) of 3.55

P.B) Polyamide-6,6 having a relative viscosity of 3.50 (measured as in P.A)

P.C.) Hydrogenated nitrile rubber obtained in accordance with Example 1 of DE-OS 3 329 974. A statistical acrylonitrile/butadiene copolymer containing 34.9% by weight acrylonitrile and having a Mooney viscosity ML 1+4/100° C. of 29 was used for hydrogenation. The degree of hydrogenation was 99.7% (as determined by infrared spectroscopy).

P.D) Statistical acrylonitrile/butadiene copolymer having an acrylonitrile content of 34.9% by weight and a Mooney viscosity ML+4/100° C. of 29 as comparison substance.

P.E.) Graft rubber obtained by radical polymerization of 20 parts by weight methyl methacrylate in the presence of 80 parts by weight of a polybutadiene in the form of a latex having a mean particle diameter ($d_{50}$) of 400 nm.

The molding compounds according to the invention and the comparison materials were produced at 280° C. in a ZSK screw extruder (60 revolutions per minute).

Test bars and plates were produced from the molding compounds by injection molding in an Arburg 350 injection molding machine under the following conditions: melt temperature 270° C., mold temperature 80° C., injection pressure 840 bar, follow-up pressure 780 bar.

The test data were determined in accordance with the following standards:

| Izod notched impact strength | (J/m): | ISO/R 180 |
| --- | --- | --- |
| Yield stress | (MPa): | DIN 53 455 |
| Ultimate tensile strength | (MPa): | DIN 53 455 |
| E Modulus in tension | (MPa): | DIN 53 457 |
| 3.5% Flexural stress | (MPa): | ISO 178 |
| Elongation | (%) | |
| Flow | (cm) | |

Weathering resistance is evaluated visually from small plates after weathering in an Atlas Weather-O-meter.

The composition of the molding compounds are shown in Table 1 and the test results in Table 2.

TABLE I

| Molding compound | Composition of the molding compounds | | | | |
|---|---|---|---|---|---|
| | P.A parts by weight | P.B parts by weight | P.C parts by weight | P.D parts by weight | P.E parts by weight |
| 1 | 80 | — | 20 | — | — |
| 2 (Comparison) | 80 | — | — | 20 | — |
| 3 (Comparison) | 80 | — | — | — | 20 |
| 4 | — | 80 | 20 | — | — |
| 5 (Comparison) | — | 80 | — | 20 | — |
| 6 (Comparison) | — | 80 | — | — | 20 |

TABLE 2

| Molding compound | Test data of the molding compounds | | | | | | | |
|---|---|---|---|---|---|---|---|---|
| | Izod notched impact strength | Ultimate tensile strength | E-Modulus in tension | 3.5% Flexural stress | Yield stress | Yield stress | Flow | Surface quality after weathering |
| 1 | 53 | 42 | 2100 | 65 | 52 | 4.3 | 41 | smooth |
| 2 (Comparison) | 14 | 40 | 2100 | 61 | 44 | 3.9 | 27 | very rough |
| 3 (Comparison) | 60 | 42 | 2200 | 75 | 60 | 4.0 | 25 | rough |
| 4 | 59 | 51 | 2400 | 71 | 60 | 5.7 | 41 | smooth |
| 5 Comparison) | 9 | 49 | 2350 | 66 | 51 | 4.5 | 31 | rough |
| 6 (Comparison) | 55 | 50 | 2200 | 65 | 55 | 4.5 | 30 | rough |

We claim:

1. Thermoplastic molding compounds prepared by melt mixing:
   A) at least 70% by weight of a partially crystalline thermoplastic polyamide or mixture of partially crystalline thermoplastic polyamides,
   B) 30 to 0.5% by weight of a hydrogenated statistical nitrile rubber with a hydrogenation of at least 80%,
   C) 0 to 29.5% by weight of non-polyamide thermoplastic resin components and, optionally
   D) standard additives in usual quantities the melt mixing temperature being between 10° C. and 80° C. above the melting point of the polyamides.

2. Thermoplastic molding compounds as claimed in claim 1, comprising A) 75 to 97.5% by weight of a thermoplastic polyamide and B) 25 to 2.5% by weight of a hydrogenated nitrile rubber.

3. Thermoplastic molding compounds as claimed in claim 1, comprising hydrogenated nitrile rubber B) with a hydrogenation of at least 95%.

4. Thermoplastic molding compounds as claimed in claim 1, comprising polyamide-6, polyamide-66 or mixtures thereof as the thermoplastic polyamide.

5. Thermoplastic molding compounds as claimed in claim 1, comprising from 1 to 22.5% by weight of thermoplastic resin components C).

6. Thermoplastic molding compounds as claimed in claim 1, containing the product obtained by hydrogenation of statistical butadiene/acrylonitrile copolymers as the hydrogenated nitrile rubber.

7. Thermoplastic molding compounds as claimed in claim 1, where the hydrogenated nitrile rubber B) results from hydrogenation of statistical copolymers of 90–95% by weight of at least one conjugated diene, 10–55% by weight of an unsaturated nitriles, optionally 0–10% by weight, based on the combined weight of the diene and the nitrile, of at least one more monomer which is copolymerisable with the conjugated diene and unsaturated nitrile.

8. Thermoplastic molding compounds as claimed in claim 7, wherein
   butadiene-1,3
   2-methylbutadiene-1,3,
   2,2-dimethylbutadiene-1,3 and
   pentadiene-1,3
are used as conjugated dienes;
   acrylonitrile and methacrylonitrile are used as unsaturated nitriles, wherein
   aromatic vinyl compounds, (meth)acrylic esters with 1–12 C-atoms in the alcohol portion of the ester, or α,β-unsaturated mono- or dicarboxylic acids are used as further monomers.

9. Thermoplastic molding compounds as claimed in claim 1, wherein the hydrogenated nitrile rubbers B) are gelfree and soluble in ketones, ethers or in chlorinated hydrocarbons.

* * * * *